United States Patent
Lin et al.

(10) Patent No.: US 8,050,681 B2
(45) Date of Patent: Nov. 1, 2011

(54) SYSTEM AND METHOD FOR CONTROLLING CONNECTIONS BETWEEN A WIRELESS ROUTER AND UNLICENSED MOBILE ACCESS CAPABLE MOBILE PHONES

(75) Inventors: Han-Tzung Lin, Taipei Hsien (TW); Yu-Hsin Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 394 days.

(21) Appl. No.: 12/417,601

(22) Filed: Apr. 2, 2009

(65) Prior Publication Data

US 2009/0268681 A1    Oct. 29, 2009

(30) Foreign Application Priority Data

Apr. 28, 2008  (CN) .......................... 2008 1 0301329

(51) Int. Cl.
*H04W 36/00* (2009.01)
(52) U.S. Cl. .................. 455/436; 455/432.1; 455/435.2; 455/450; 455/452.1; 370/328; 370/330; 370/331; 370/338
(58) Field of Classification Search .................. 370/328, 370/330, 331, 327, 338, 316; 455/432.1, 455/435.2, 436–444, 450, 451, 452.1
See application file for complete search history.

(56) References Cited

U.S. PATENT DOCUMENTS

| | | | | |
|---|---|---|---|---|
| 7,127,250 B2 * | 10/2006 | Gallagher et al. | ............ | 455/436 |
| 7,283,822 B2 * | 10/2007 | Gallagher et al. | ............ | 455/436 |
| 7,546,125 B2 * | 6/2009 | Sharma et al. | ................ | 455/436 |
| 7,606,190 B2 * | 10/2009 | Markovic et al. | ............. | 370/328 |
| 7,640,008 B2 * | 12/2009 | Gallagher et al. | ......... | 455/414.1 |
| 7,818,007 B2 * | 10/2010 | Gallagher et al. | ............ | 455/436 |
| 7,843,900 B2 * | 11/2010 | Gallagher et al. | ............ | 370/352 |
| 7,941,149 B2 * | 5/2011 | Wang et al. | .................. | 455/445 |
| 2007/0192437 A1 | 8/2007 | Wang et al. | | |
| 2007/0233899 A1 * | 10/2007 | Aborn | ......................... | 709/245 |
| 2007/0258508 A1 * | 11/2007 | Werb et al. | ..................... | 375/140 |
| 2007/0259700 A1 | 11/2007 | Meier et al. | | |
| 2008/0069071 A1 * | 3/2008 | Tang | ............................. | 370/342 |
| 2008/0080378 A1 * | 4/2008 | Kim et al. | ..................... | 370/234 |
| 2010/0074181 A1 * | 3/2010 | Markovic et al. | ............. | 370/328 |
| 2010/0226346 A1 * | 9/2010 | Caldwell et al. | ............. | 370/338 |
| 2011/0116442 A1 * | 5/2011 | Caldwell et al. | ............. | 370/328 |

FOREIGN PATENT DOCUMENTS

EP         1868354         12/2007

* cited by examiner

*Primary Examiner* — Linh Nguyen
(74) *Attorney, Agent, or Firm* — Altis Law Group, Inc.

(57) ABSTRACT

A system for controlling connections between a wireless router and unlicensed mobile access capable mobile phones is provided. The system acquires and stores a media access control address and an Internet protocol address of each mobile phone in an address list. The system periodically checks whether each Internet protocol address recorded in an address resolution protocol cache table of the wireless router matches a corresponding media access control address recorded in the cache table. If the Internet protocol address does not match the corresponding media access control address in the cache table, the system further looks up a media access control address corresponding to the Internet protocol address, and sends an address resolution protocol unicast request to a mobile phone having the media access control address.

12 Claims, 2 Drawing Sheets

SYSTEM AND METHOD FOR CONTROLLING CONNECTIONS BETWEEN A WIRELESS ROUTER AND UNLICENSED MOBILE ACCESS CAPABLE MOBILE PHONES

BACKGROUND

1. Technical Field

Embodiments of the present disclosure generally relate to communication management, and more particularly, to a system and method for controlling connections between a wireless router and mobile phones that use unlicensed mobile access (UMA) technology.

2. Description of Related Art

In an area with limited or no coverage of a mobile phone carrier network, a mobile phone may have to roam on another carrier's network. However, with a UMA capable mobile phone and a wireless router with Internet access, people are able to make phone calls at any location.

UMA is a technology that allows end users' mobile phones to freely switch between a global system for mobile communication (GSM) network and the wireless router Internet networks for the transmission of voice and packet data. Thus, end users can make phone calls where they formerly had limited or no coverage.

However, a disadvantage of making phone calls through the wireless router Internet networks is that, much power of the mobile phone will be consumed. In order to keep a longer work time, a low-power mode may be adopted by the mobile phone. However, in the low-power mode, the mobile phone can not respond to address resolution protocol (ARP) broadcast requests sent from the wireless router, so that the communication connection between the wireless router and the mobile phone will break off.

DETAILED DESCRIPTION

All of the processes described below may be embodied in, and fully automated via, function code modules executed by one or more general purpose computers or processors. The code modules may be stored in any type of computer-readable medium or other computer storage device. Some or all of the methods may alternatively be embodied in specialized computer hardware.

Figure 1:
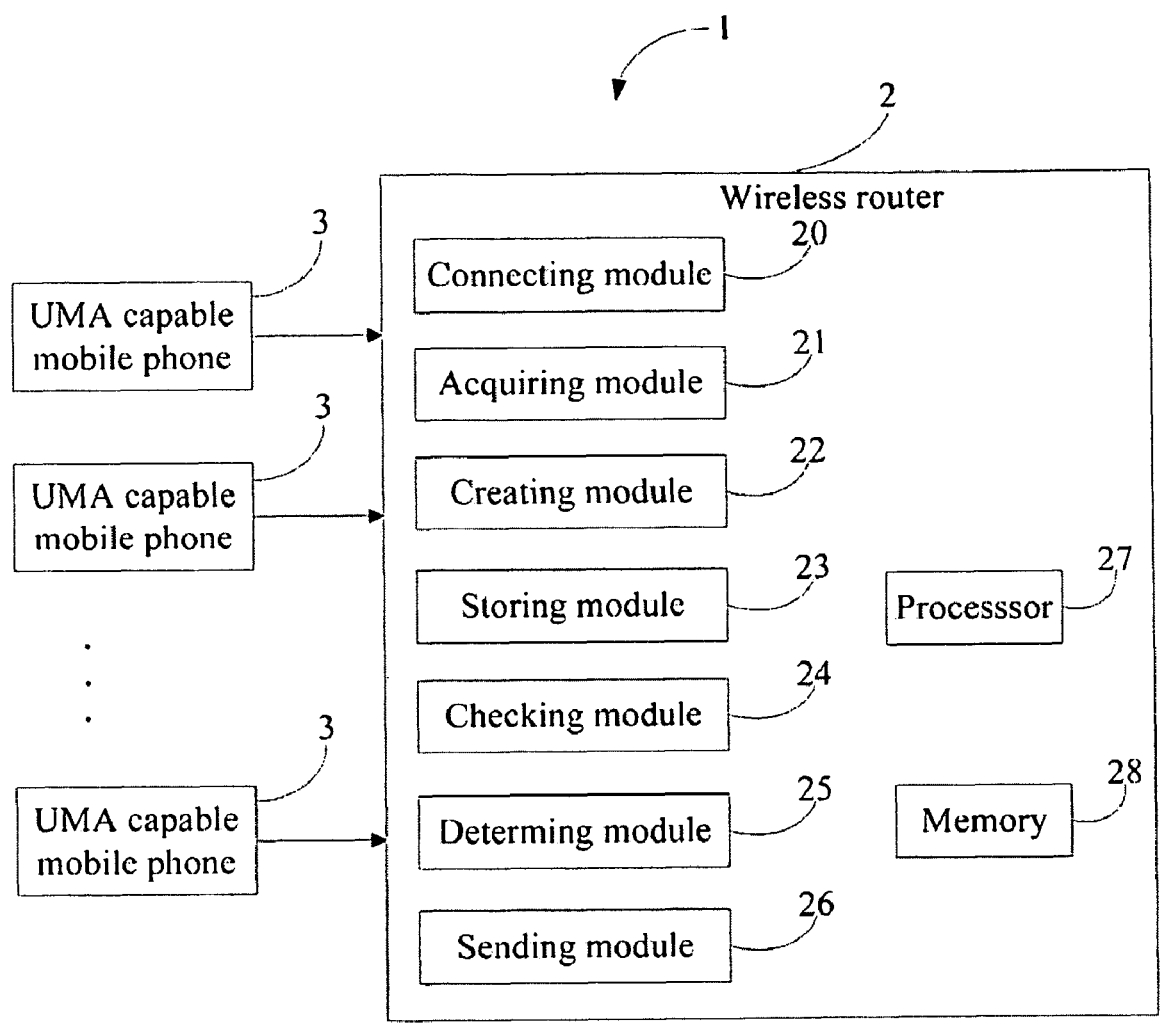
FIG. 1 is a block diagram of one embodiment of a system for controlling connections between a wireless router and UMA capable mobile phones.

FIG. 1 is a block diagram of one embodiment of a system 1 for controlling connections between a wireless router 2 and UMA capable mobile phones 3. The system 1 includes the wireless router 2 and a plurality of UMA capable mobile phones (hereinafter referred to as "UMA phones") 3.

The wireless router 2 comprises an address resolution protocol (ARP) cache table for recording a media access control (MAC) address and an Internet protocol (IP) address of each device that has a communication connection with the wireless router 2 in a network, such as the Internet network. There exists a one-to-one relationship between the MAC address and the IP address in the ARP cache table. It will be understood that the MAC address is a unique identifier that is assigned to a network interface card (NIC) of the device by a manufacturer of the device, and the IP address is a numerical identification (logical address) that is assigned to the NIC of the device for communication. The device may be a computer, a personal digital assistant (PDA), or a mobile phone, such as one of the UMA phones 3.

In one embodiment, the wireless router 2 may include a storage system, such as a memory 28. The memory 28 may store operational programs used to control and implement one or more systems and methods of the present disclosure. In one embodiment, the operational programs comprise a connecting module 20, an acquiring module 21, a creating module 22, a storing module 23, a checking module 24, a determining module 25, and a sending module 26.

It may be understood that, one or more specialized or general purpose processors, such as a processor 27 in the wireless router 2, may be used to execute one or more computerized instructions for the function modules 20, 21, 22, 23, 24, 25, and 26.

The connecting module 20 is configured for establishing communication connections between the wireless router 2 and the UMA phones 3 via the network. Accordingly, once communication has been established between the UMA phones and the network 3, the UMA phones 3 can freely switch between the GSM network and the wireless router Internet networks for transmission of voice and packet data.

The acquiring module 21 is configured for acquiring a MAC address and an IP address of each of the UMA phones 3 via the network.

The creating module 22 is configured for creating an address list, and recording the MAC addresses and the IP addresses of the UMA phones 3 in the address list. There also exists a one-to-one relationship between the MAC addresses and the IP addresses in the address list.

The storing module 23 is configured for storing the address list into the memory 28 of the wireless router 2.

The checking module 24 is configured for checking periodically (such as 20 minutes, for example) whether each IP address recorded in the ARP cache table matches a corresponding MAC address recorded in the ARP cache table. In one embodiment, the checking module 24 searches a MAC address of a device in the network according to the IP address of the device recorded in the ARP cache table, and if a search result is void, the checking module 24 determines that the IP address does not match the corresponding MAC address recorded in the ARP cache table. In another embodiment, the checking module 24 searches a MAC address of a device in the network and looks up the IP address of the device recorded in the ARP cache table, and if the searched MAC address is different from the MAC address recorded in the ARP cache table corresponding to the IP address of the device recorded in the ARP cache table, the checking module 24 determines that the IP address does not match the corresponding MAC address recorded in the ARP cache table. If the IP address of a device recorded in the ARP cache table does not match the corresponding MAC address recorded in the ARP cache table, the checking module 24 determines that the device disconnects with the wireless router 2. In contrast, if the IP address of a device recorded in the ARP cache table matches the corresponding MAC address recorded in the ARP cache table, the checking module 24 determines that the device connects normally with the wireless router 2.

The determining module 25 is configured for determining whether an IP address recorded in the ARP cache table exists in the address list when the IP address does not match the corresponding MAC address recorded in the ARP cache table. If the IP address exists in the address list, the determining module 25 determines that the device having the IP address is one of the UMA phones 3. In contrast, if the IP address does not exist in the address list, the determining module 25 determines that the device having the IP address is not one of the UMA phones 3, but a computer or a PDA, or some other electronic device having a communication connection with the wireless router 2 in the network.

The sending module 26 is configured for looking up a MAC address corresponding to the IP address from the address list if the IP address exists in the address list, and sending an ARP unicast request to the UMA phone 3 having the MAC address. After receiving the ARP unicast request, the UMA phone 3 have to respond to the ARP unicast request even in a low-power mode of the UMA phones. Thus, the communication connection between the UMA phone 3 and the wireless router 2 is prolonged. The sending module 26 is further configured for sending an ARP broadcast request to all the devices in the network if the IP address is not recorded in the address list. The ARP broadcast request has the broadcast address of ff:ff:ff:ff:ff:ff, and all the devices in the network can receive the ARP broadcast request. All the devices may include computers, PDAs, and the plurality of UMA phones 3.

Figure 2:
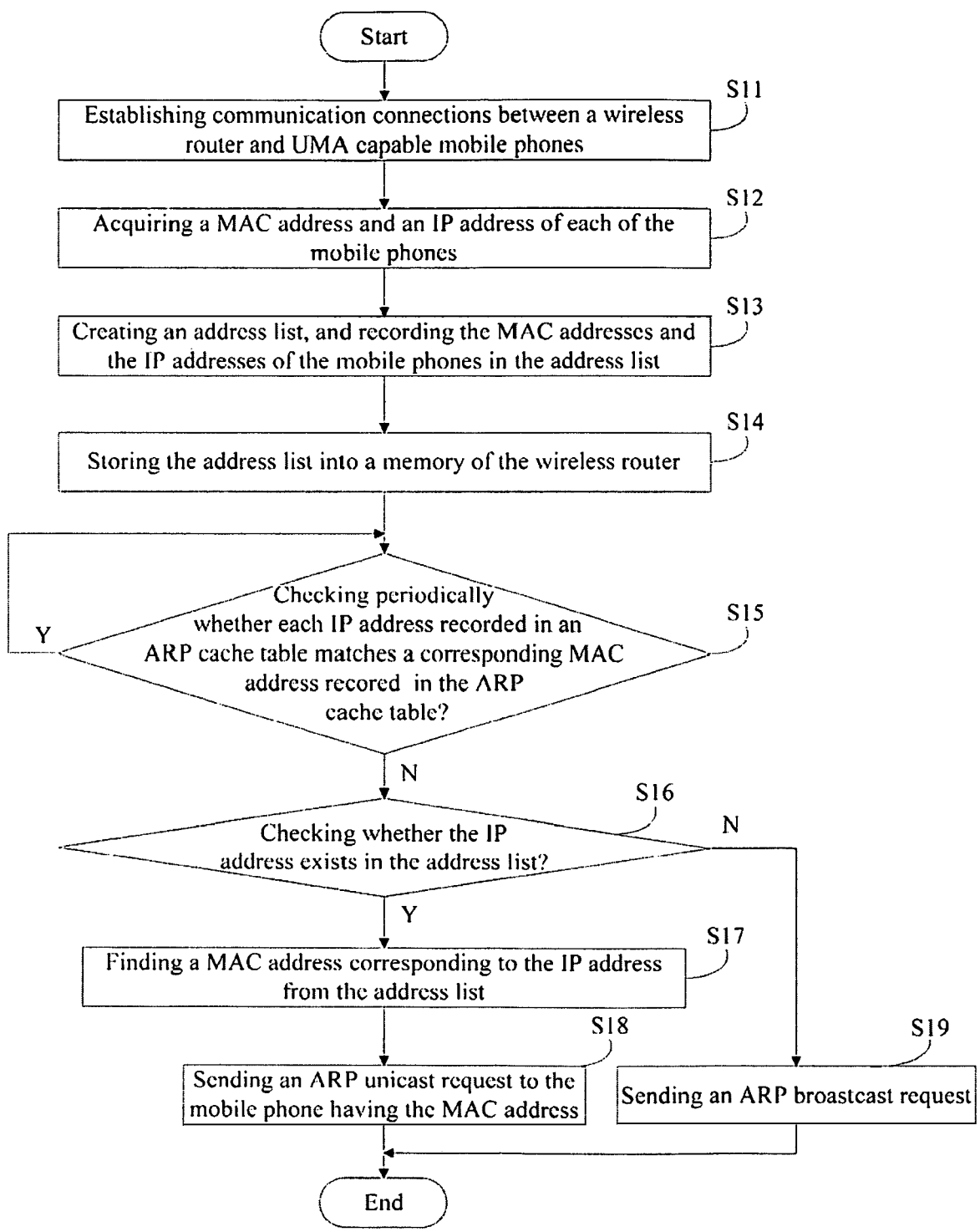
FIG. 2 is a flowchart illustrating one embodiment of a method for controlling connections between a wireless router and UMA capable mobile phone.

FIG. 2 is a flowchart illustrating one embodiment of a method for controlling connections between the wireless router 2 and the UMA phones 3. Depending on the embodiment, additional blocks in the flow of FIG. 2 may be added, others removed, and the ordering of the blocks may be changed.

In block S11, the connecting module 20 establishes communication connections between the wireless router 2 and the UMA phones 3 via the Internet network, so as to enable the UMA phones 3 to freely switch between the GSM network and the wireless router Internet networks for transmission of voice and packet data.

In block S12, the acquiring module 21 acquires a MAC address and an IP address of each of the UMA phones 3 via the Internet network.

In block S13, the creating module 22 creates an address list, and records the MAC addresses and the IP addresses of the UMA phones 3 in the address list.

In block S14, the storing module 23 stores the address list into the memory 28 of the wireless router 2.

In block S15, the checking module 24 periodically checks whether each IP address recorded in an ARP cache table of the wireless router 2 matches a corresponding MAC address recorded in the ARP cache table. The IP addresses and the MAC addresses recorded in the ARP cache table belong to devices having communication connections with the wireless router 2. It may be understood that, the IP addresses and the MAC addresses in the ARP cache table have a one-to one relationship. The devices may be computers, PDAs, and mobile phones, for example the UMA phones 3. Block S15 will repeat if the IP address matches the corresponding MAC address recorded in the ARP cache table. Otherwise, the flow may move to block S16 described below if the IP address does not match the corresponding MAC address recorded in the ARP cache table.

In block S16, the determining module 25 determines whether an IP address recorded in the ARP cache table exists in the address list. The flow moves to block S19 if the IP address exists in the address list. Otherwise, the flow moves to block S17 if the IP address does not exist in the address list.

In block S17, the sending module 26 looks up a MAC address corresponding to the IP address from the address list if the IP address exists in the address list.

In block S18, the sending module sends an ARP unicast request to the UMA phone 3 having the MAC address. After receiving the ARP unicast request, the UMA phone 3 responds to the ARP unicast request even in a low-power mode, thus prolonging the communication connection between the wireless router 2 and the UMA phone 3.

In another embodiment, in block S19, The sending module 26 sends an ARP broadcast request which has the broadcast address of ff:ff:ff:ff:ff:ff to all the devices in the network. All the devices may include computers, PDAs, and the plurality of UMA phones 3.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for controlling connections between a wireless router and unlicensed mobile access (UMA) capable mobile phones, the system comprising:
   a connecting module configured for establishing communication connections between the wireless router and the UMA capable mobile phones, the wireless router having an address resolution protocol (ARP) cache table for recording a media access control (MAC) address and an Internet protocol (IP) address of an electronic device that has a communication connection with the wireless router in a network;
   an acquiring module configured for acquiring a MAC address and an IP address of each of the UMA capable mobile phones via the network;
   a creating module configured for creating an address list, and recording the MAC addresses and the IP addresses of the UMA capable mobile phones in the address list;
   a checking module configured for periodically checking whether each IP address recorded in the ARP cache table matches a corresponding MAC address recorded in the ARP cache table;
   a determining module configured for determining if the IP address recorded in the ARP cache table is recorded in the address list upon the condition that the IP address does not match the corresponding MAC address;
   a sending module configured for looking up a MAC address corresponding to the IP address from the address list upon the condition that the IP address is recorded in the address list, and sending a ARP unicast request to a UMA capable mobile phone having the MAC address to force the UMA capable mobile phone to respond to the ARP unicast request, so as to prolong the communication connection between the wireless router and the UMA capable mobile phone; and
   at least one processor that executes at least one computerized instruction for the connection module, the acquiring module, the creating module, the checking module, the determining module, and the sending module.

2. The system as described in claim 1, wherein the electronic device that has a communication connection with the wireless router in the network is selected from the group consisting of a computer, a personal digital assistant (PDA), and a UMA capable mobile phone.

3. The system as described in claim 1, further comprising:
   a storing module configured for storing the address list into a memory of the wireless router.

4. The system as described in claim 2, wherein the sending module is further configured for sending an ARP broadcast request to all the electronic devices in the network upon the condition that the IP address is not recorded in the address list.

5. A method for controlling connections between a wireless router and unlicensed mobile access (UMA) capable mobile phones, the method comprising:
establishing communication connections between the wireless router and the UMA capable mobile phones, the wireless router having an address resolution protocol (ARP) cache table for recording a media access control (MAC) address and an Internet protocol (IP) address of an electronic device that has a communication connection with the wireless router in a network;
acquiring a MAC address and an IP address of each of the UMA capable mobile phones via the network;
creating an address list, and recording the MAC addresses and the IP addresses of the UMA capable mobile phones in the address list;
periodically checking whether each IP address recorded in the ARP cache table matches a corresponding MAC address recorded in the ARP cache table;
determining if the IP address recorded in the ARP cache table is recorded in the address list upon the condition that the IP address does not match the corresponding MAC address;
looking up a MAC address corresponding to the IP address from the address list upon the condition that the IP address is recorded in the address list; and
sending an ARP unicast request to the UMA capable mobile phone having the MAC address, to force the UMA capable mobile phone to respond to the ARP unicast request, so as to prolong the communication connection between the wireless router and the UMA capable mobile phone.

6. The method as described in claim 5, wherein the electronic device that has a communication connection with the wireless router in the network is selected from a group of a computer, a personal digital assistant (PDA), and a UMA capable mobile phone.

7. The method as described in claim 5, further comprising:
storing the address list into a memory of the wireless router.

8. The method as described in claim 6, further comprising:
sending an ARP broadcast request to all the electronic devices in the network upon the condition that the IP address is not recorded in the address list.

9. A non-transitory storage medium having stored thereon instructions that, when executed by a processor, causing the processor to perform a method for controlling connections between a wireless router and UMA capable mobile phones, the method comprising:
establishing communication connections between the wireless router and the UMA capable mobile phones, the wireless router having a address resolution protocol (ARP) cache table for recording a media access control (MAC) address and an Internet protocol (IP) address of an electronic device that has a communication connection with the wireless router in a network;
acquiring a MAC address and an IP address of each of the UMA capable mobile phones via the network;
creating an address list, and recording the MAC addresses and the IP addresses of the UMA capable mobile phones on the address list;
periodically checking whether each IP address recorded in the ARP cache table matches a corresponding MAC address recorded in the ARP cache table;
determining if the IP address recorded in the ARP cache table is recorded in the address list upon the condition that the IP address does not match the corresponding MAC address;
looking up a MAC address corresponding to the IP address from the address list upon the condition that the IP address is recorded in the address list; and
sending an ARP unicast request to the UMA capable mobile phone having the MAC address, to force the UMA capable mobile phone to respond to the ARP unicast request, so as to prolong the communication connection between the wireless router and the UMA capable mobile phone.

10. The non-transitory storage medium as described in claim 9, wherein the electronic device that has a communication connection with the wireless router in the network is selected from the group consisting of a computer, a personal digital assistant (PDA), and a UMA capable mobile phone.

11. The non-transitory storage medium as described in claim 9, wherein the method further comprises:
storing the address list into a memory of the wireless router.

12. The non-transitory storage medium as described in claim 10, wherein the method further comprises:
sending an ARP broadcast request to all the electronic devices in the network upon the condition that the IP address is not recorded in the address list.

* * * * *